United States Patent
Miwa

(10) Patent No.: US 11,007,822 B2
(45) Date of Patent: May 18, 2021

(54) MOTORCYCLE TIRE FOR RUNNING ON ROUGH TERRAIN

(71) Applicant: Sumitomo Rubber Industries, Ltd., Kobe (JP)

(72) Inventor: Takuya Miwa, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 287 days.

(21) Appl. No.: 15/820,148

(22) Filed: Nov. 21, 2017

(65) Prior Publication Data

US 2018/0154699 A1    Jun. 7, 2018

(30) Foreign Application Priority Data

Dec. 1, 2016    (JP) .............................. JP2016-234360

(51) Int. Cl.
*B60C 11/11* (2006.01)
*B60C 11/03* (2006.01)

(52) U.S. Cl.
CPC ........... *B60C 11/11* (2013.01); *B60C 11/0302* (2013.01); *B60C 11/0306* (2013.01); *B60C 2200/10* (2013.01); *B60C 2200/14* (2013.01)

(58) Field of Classification Search
CPC . B60C 11/11; B60C 2200/14; B60C 2200/10; B60C 11/0306; B60C 11/0302; B60C 11/13; B60C 11/12
See application file for complete search history.

(56) References Cited

U.S. PATENT DOCUMENTS 5,669,993 A * 9/1997 Moseley ................. B60C 11/11
152/209.1
2013/0306207 A1   11/2013 Matsumura

FOREIGN PATENT DOCUMENTS

| EP | 2 263 888 A1 | 12/2010 | |
| EP | 2 423 006 A1 | 2/2012 | |
| EP | 2 664 465 A1 | 11/2013 | |
| JP | 2006188214 | * 7/2006 | ............. B60C 11/11 |
| JP | 2007-112396 A | 5/2007 | |
| JP | 2007112396 | * 5/2007 | ............. B60C 11/04 |
| JP | 2013-241062 A | 12/2013 | |
| WO | WO 00/26040 A1 | 5/2000 | |

OTHER PUBLICATIONS

Oku JP-2007112396 English Translation (Year: 2007).*
Roesgen JP2006188214 Translation (Year: 2006).*
European Search Report issued in European Patent Application No. EP 17 20 3339, dated Apr. 24, 2018.

* cited by examiner

*Primary Examiner* — Jacob T Minskey
*Assistant Examiner* — Adrien J Bernard
(74) *Attorney, Agent, or Firm* — Birch, Stewart, Kolasch & Birch, LLP

(57) ABSTRACT

A motorcycle tire for running on rough terrain comprises a tread portion provided with blocks each having a polygonal ground contacting top surface. The blocks include a twist block having a twisted portion from the top surface toward the radially inside.

4 Claims, 5 Drawing Sheets

MOTORCYCLE TIRE FOR RUNNING ON ROUGH TERRAIN

TECHNICAL FIELD

The present invention relates to a motorcycle tire for running on rough terrain.

BACKGROUND ART

Japanese Patent Application Publication No. 2013-241062 discloses a motorcycle tire for running on rough terrain, wherein the tread portion is provided with a plurality of blocks whose ground contacting top surface is rectangle. When running on rough terrain, the edges of the ground contacting top surfaces of such blocks dig into the ground surface to generate a gripping force.
The ground contacting top surface of such block has a contour shape similar to the contour shape of a cross section of the block at the base, therefore, it is difficult to improve the durability of the block, and the traction performance and mud self-ejection performance of the tire in good balance.

For example, in order to focus on an improvement in the traction performance during cornering, it is conceivable to incline, with respect to the tire axial direction, an edge of the ground contacting top surface of a block which edge is on the heel-side in the tire rotation direction. As a result, the heel-side edge of the cross sectional shape of the block at the base is also inclined with respect to the tire axial direction. In this case, for example when running on rough terrain, an heel-side end portion of the heel-side edge at the base of the block, is more likely to be subjected to a large stress, and there is a possibility that the block is damaged starting from the heel-side end portion.

Meanwhile, in order to focus on an improvement in the mud self-ejection performance of the tread portion, it is conceivable to incline the heel-side edge of the cross sectional shape of the block at the base with respect to the tire axial direction. As a result, the heel-side edge of the ground contacting top surface of the block is also inclined with respect to the tire axial direction. In this case, there is a problem such that the traction performance is decreased during straight running in particular.

SUMMARY OF THE INVENTION

The present invention was made in view of the circumstances described above, and it is an object of the present invention to provide a motorcycle tire for running on rough terrain in which the durability of a block, and the traction performance and mud self-ejection performance of the tire can be improved in good balanced.

According to the present invention, a motorcycle tire for running on rough terrain comprises a tread portion provided with blocks each having a polygonal ground contacting top surface, and the blocks include a twist block having a twisted portion from the top surface toward the radially inside.

Further, the motorcycle tire according to the present invention may have the following features:
(1) the twisted portion is twisted about an axis intersecting the top surface;
(2) the twist block extends radially outwardly from a bottom surface of the tread portion, and the area of the cross section of the twist block when being cut at the bottom surface of the tread portion is larger than the area of the top surface;
(3) the tire has an intended rotational direction, and
the top surface of the twist block has an oblique edge on its heel side in the intended rotational direction, which is inclined with respect to the tire axial direction, wherein the shape of the cross section of the twist block when being cut at the bottom surface of the tread portion has an axial edge which extends in the tire axially direction so as that one of side surfaces of the twist block is formed between the axial edge and the above-said oblique edge;
(4) when the tread portion is sectioned into a crown region centered on the tire equator and having a width of ⅓ of a developed tread width, a pair of shoulder regions extending toward the tire equator from the respectively tread edges and each having a width of ⅙ of the developed tread width, and a pair of middle regions defined between the crown region and the shoulder regions and each having a width of ⅙ of the developed tread width: the middle regions are each provided with the twist blocks;
(5) the area of the cross section of the twist block when being cut in parallel with the above-said top surface is gradually increased towards the radially inside of the tire;

DESCRIPTION OF THE PREFERRED EMBODIMENTS

Figure 1:
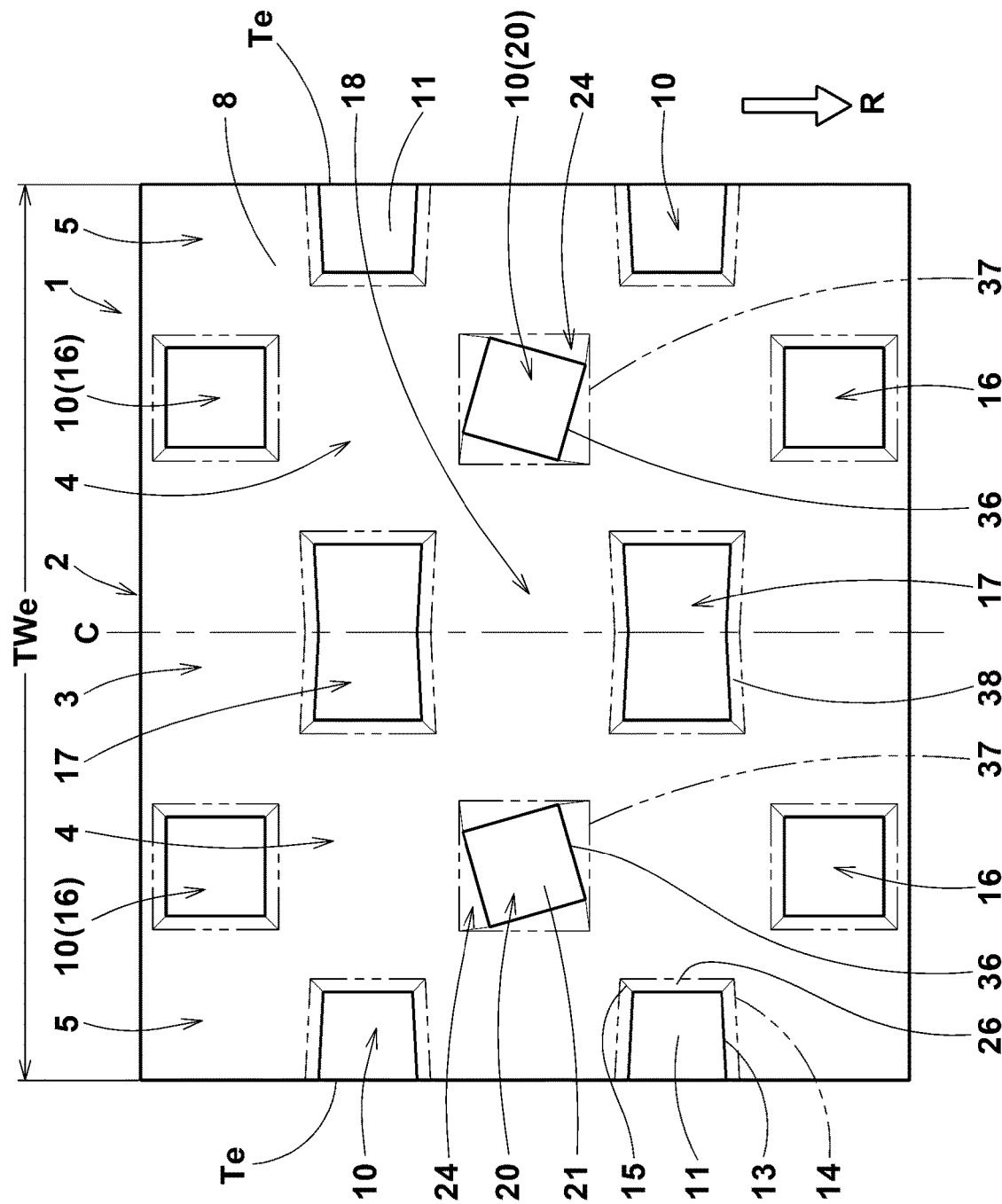
FIG. 1 is a developed partial view of the tread portion of a motorcycle tire for running on rough terrain according as an embodiment of the present invention.

Embodiments of the present invention will now be described in conjunction with accompanying drawings.
In the drawings, a motorcycle tire for running on rough terrain according to the present invention is a pneumatic tire. As well known in the art, a pneumatic tire comprises a tread portion 2 whose radially outer surface defines the tread, a pair of axially spaced bead portions mounted on rim seats, and a pair of sidewall portions extending between the tread edges and the bead portions.
As a characteristic of a motorcycle tire, the tread portion 2 (inclusive of the carcass, tread reinforcement and a tread rubber thereon) is convexly curved in the tire meridian section so that the tread surface between the tread edges Te is curved like an arc swelling radially outwardly, and the maximum cross sectional width of the tire 1 occurs between the tread edges Te.
In each of the following embodiments, the motorcycle tire 1 is designed for motocross race. And the motorcycle tires 1 have an intended tire rotational direction R resulting from the tread pattern.

When the tread portion 2 is sectioned into a crown region 3 centered on the tire equator C and having a width of ⅓ of a developed tread width TWe, a pair of shoulder regions 5 extending toward the tire equator C from the respectively tread edges Te and each having a width of ⅙ of the developed tread width TWe, and a pair of middle regions 4 defined between the crown region 3 and the shoulder regions 5 and each having a width of ⅙ of the developed tread width TWe:
each region 3, 4 and 5 is provided with blocks 10 rising radially outwardly from the bottom surface 8 of the tread portion 2.

The developed tread width TWe is a distance in the tire axial direction between the tread edges Te and Te of the tread portion 2 when developed in a plane. The tread edges Te are defined by the axially outer edges of the axially outermost blocks 10.

In FIGS. 1, 3, 4 and 5, the contours of the top surfaces of the blocks 10 (hereinafter, "top contour shape") are shown in solid lines, the contours of the cross sections of the blocks when being cut at the bottom surface of the tread portion (hereinafter, "base contour shape") are shown in two-dot chain lines, and radially extending edge lines between sidewall surfaces of each block 10 are shown in thin solid lines.

As shown, the ground contacting top surface 11 of each of the blocks 10 has a polygonal shape.

The blocks 10 include a twist block 20.

Figure 2:
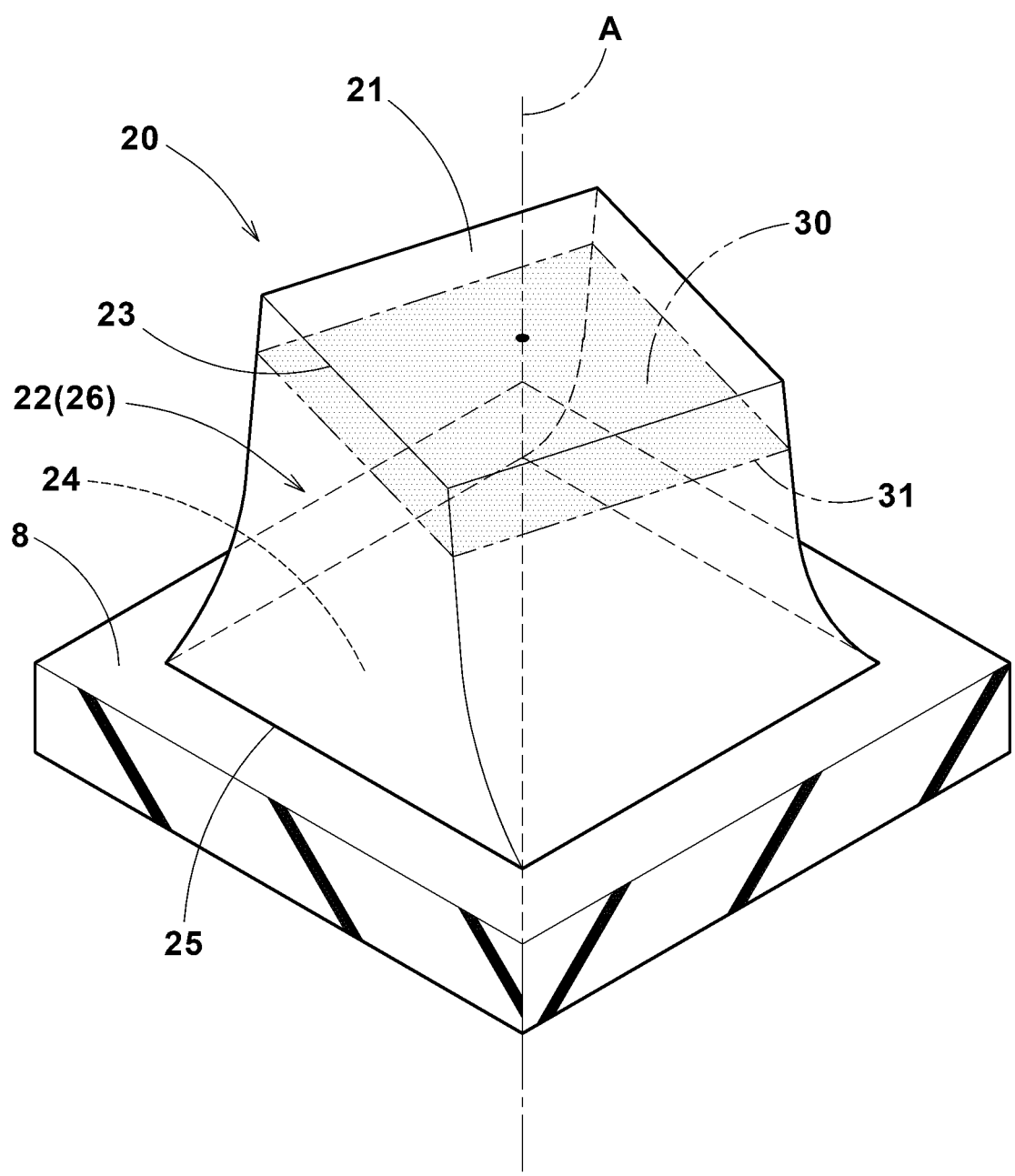
FIG. 2 is a perspective view of a twist block thereof.
Figure 3:
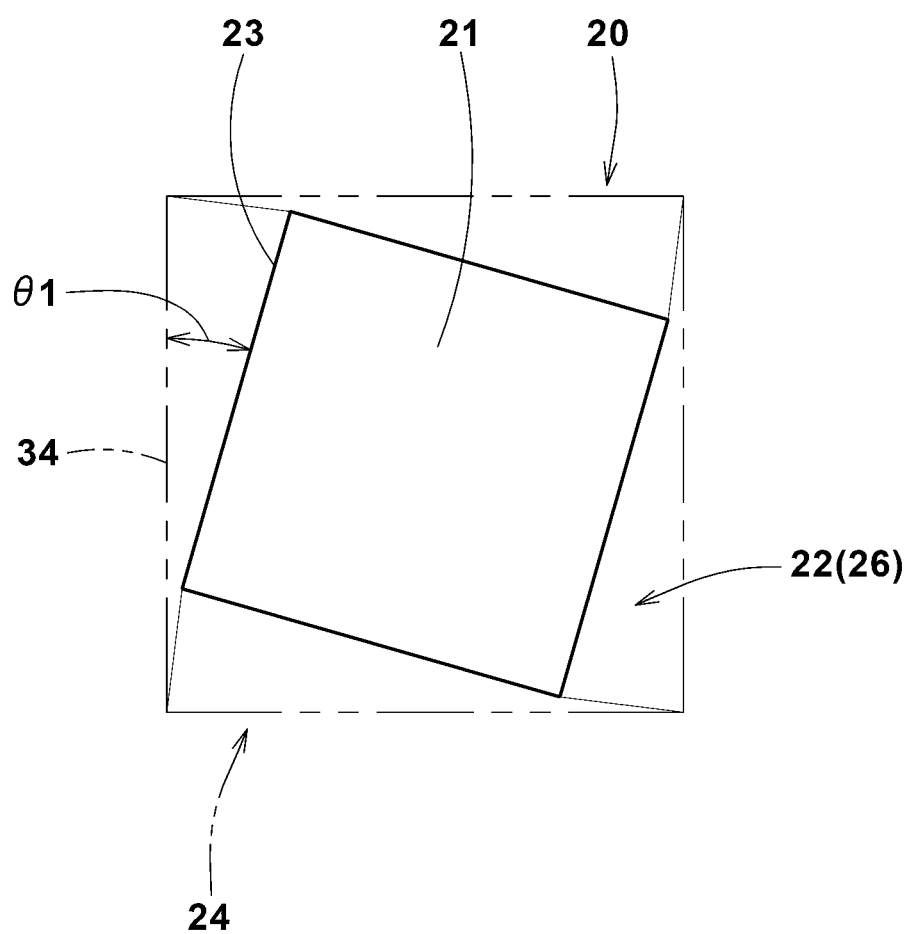
FIG. 3 is a top view of the twist block.

In the present embodiment, as shown in FIGS. 2 and 3, the top contour shape and the base contour shape of the twist block 20 are rectangular.

The twist block 20 has a twisted portion 22 from the top surface 21 toward the radially inside of the tire as shown in FIG. 2. In the twist block 20, therefore, it is possible to incline, with respect to the tire axial direction, an edge 23 of the top surface 21 at different angles from an edge 25 of the contour shape of the base 24 of the twist block at the bottom surface 8 of the tread portion 2, depending on the purposes. As a result, the durability of the twist block 20, the traction performance of the tire and the mud self-ejection performance of the tread portion can be improved in good balance.

The shape of the cross section 30 of the twist block 20 when being cut in parallel with the top surface 21 at any radial position within the twisted portion 22, is rotated around an axis (A), which axis intersects the top surface 21 perpendicularly thereto, continuously from the top surface 21 toward the radially inside (in the present embodiment, to the base 24 of the block), while maintaining the top contour shape (inclusive of similar figures having different sizes).

The twist angle of the top surface 21 with respect to the base 24 (which may be obtained by an angle θ1 between the corresponding sides of the top contour shape and base contour shape as shown in FIG. 3) is set in a range of not less than 5 degrees, preferably not less than 10 degrees, but not more than 45 degrees, preferably not more than 25 degrees. If the twist angle θ1 is smaller than 5 degrees, the effect described above is likely to hardly obtain. If the twist angle θ1 is larger than 45 degrees, there is a possibility that the durability of the twist block 20 is lowered.

Preferably, the area of the cross section 30 of the twist block 20 is gradually increased toward the radially inside of the tire. Thereby, the stiffness of the twist block 20 is increased in its base portion, and the durability of the twist block 20 is improved.

In order to ensure the amount of digging into the ground of the twist block 20, while maintaining the durability of the twist block 20, the area s1 of the top surface 21 is preferably not less than 0.45 times, more preferably not less than 0.50 times, but preferably not more than 0.70 times, more preferably not more than 0.65 times the area s2 of the contour shape of the base 24

As shown in FIG. 3, in the top view of the twist block 20, it is preferable that the top surface 21 is positioned within the base 24, more specifically the edges 23 of the top surface 21 are positioned within a region surrounded by the edges 34 of the base 24.

If the edges 23 of the top surface 21 partially protrude from the surrounded region, then the twist block 20 easily leans toward the protruding direction when contacting with the ground, and there is a possibility that the steering stability is deteriorated, and the durability of the twist block 20 is decreased.

In the present embodiment, as shown in FIG. 1, the twist blocks 20 are disposed only in the middle regions 4.

In the middle regions 4, non-twisted blocks 16 without the twisted portion are arranged in the tire circumferential direction in addition to the twist blocks 20. Preferably, the twist blocks 20 and non-twisted blocks 16 are arranged alternately in the tire circumferential direction.

The top surface 21 of the twist block 20 has an oblique edge 36 on its heel side in the intended rotational direction R which edge is inclined with respect to the tire axial direction. on the other hand, the contour shape of the base 24 of the twist block 20 has an axial edge 37 on its heel side in the intended rotational direction R which edge extends in parallel with the tire axial direction. And one of the sidewall surfaces 26 on the heel side extends between the oblique edge 36 and the axial edge 37 as its radially outer edge and inner edge, respectively. By the oblique edge 36 of the top surface 21, the twist block 20 can improve the traction performance during cornering made with a certain slip angle. Further, the twist block 20 can receive its shear stress by the entire axial edge 37 of the base 24, and can exert excellent durability.

It is preferable that the oblique edge 36 of the top surface 21 is inclined to the opposite direction to the intended rotational direction R towards the tire equator C, and the blocks 10 include crown blocks 17 which are arranged circumferentially of the tire in the crown region 3.

Thereby, when running on rough terrain, the twist blocks 20 push and guide the soil and mud toward the crown blocks 17, and the crown blocks 17 shear the guided more soil and mud to provide a greater traction.

In the present embodiment, the twist blocks 20 disposed in one of the middle regions 4 are respectively aligned with those in the other middle region 4. Therefore, the motorcycle tire 1 can exert a greater traction on such a soft ground that the tire 1 sinks into the soil up to the middle regions 4.

In order to effectively derive the above described advantageous effect, it is preferable that, on both axial outer sides of each of spaces 18 between the crown blocks 17 in the tire circumferential direction, two of the twist blocks 20 in the middle regions 4 are respectively positioned.

The crown block 17 preferably has an axially elongated rectangular shape. Preferably, a sidewall surface 38 of the crown block 17 on its heel side which extends in the tire axial direction is concaved toward the opposite direction to the intended rotational direction R. Such crown block 17 efficiently catches the soil and mud pushed and guided by the twist blocks 20, and it is possible to provide a larger reaction force.

Figure 4:
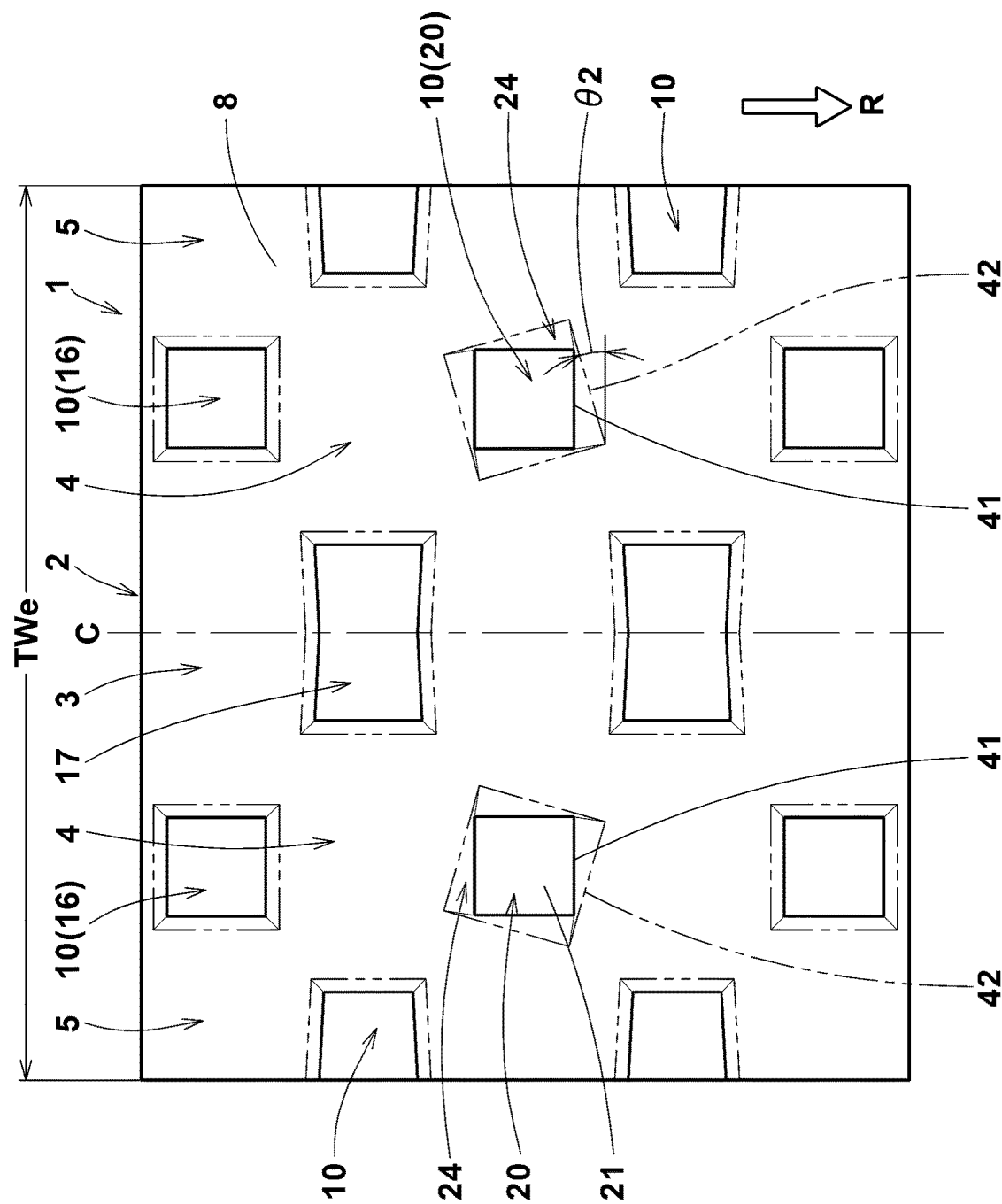
FIG. 4 is a developed partial view of the tread portion of a motorcycle tire for running on rough terrain according as another embodiment of the present invention.

FIG. 4 shows the tread portion 2 of the motorcycle tire 1 as another embodiment of the present invention, wherein the top surface 21 of the twist block 20 has an axial edge 41 on its heel side in the intended rotational direction R, which extends parallel with the tire axial direction, and the counter shape of the base 24 of the twist block 20 has an oblique edge 42 on its heel side in the intended rotational direction R, which is inclined with respect to the tire axial direction at an angle θ2. Preferably, the angle θ2 is set in a range from 15 to 45 degrees. Such twist blocks 20 can exhibit excellent mud discharge performance, while providing a greater traction by the axial edge 41 of the top surface 21.

As a still another embodiment of the present invention (not shown), the tread portion 2 may be provided with the above described two types of the twist blocks 10 shown in FIG. 1 and FIG. 4.

As a still another embodiment of the present invention (not shown), the tread portion 2 may be provided in the crown region 3 and/or shoulder regions 5 with the twist blocks 10 in addition to the middle regions 4.

While detailed description has been made of preferable embodiments of the present invention, the present invention can be embodied in various forms without being limited to the illustrated embodiment.

Comparison Tests

Figure 5:
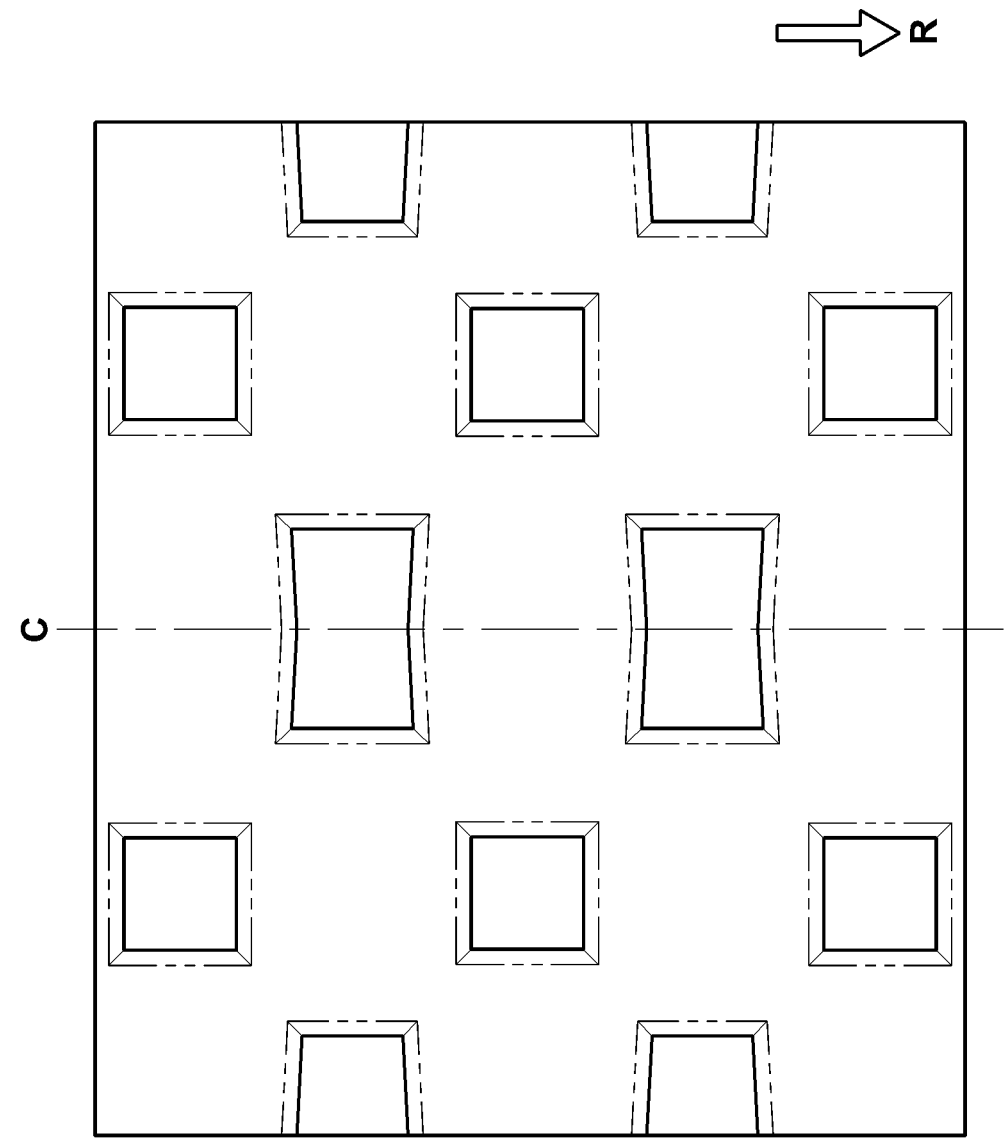
FIG. 5 is a developed partial view of the tread portion of a motorcycle tire used as a comparative example.

Motorcycle tires of size 120/80-19 (rim size 2.15×19) were experimentally manufactured as test tires including embodiment tires Ex1-Ex12 having tread patterns based on the tread patterns shown in FIGS. 1 and 4, and a comparative tire Ref having the tread pattern shown in FIG. 5.

The specifications are shown in Table 1.

Each test tire was tested for the traction performance and block durability as follows.

<Traction Performance Test>
using a 450 cc motocross bike, the traction performance when running on rough terrain was evaluated by the test rider.
(Tire Pressure 80 kPa)
The results are indicated in Table 1 by an index based on the comparative tire Ref being 100, wherein the larger the value, the better the traction performance.

<Block Durability Test>
using a 1.7 meter tire test drum, each test tire was run at a speed of 50 km/h under a vertical load of 1.95 KN, and the travel distance until chipping off was occurred on the blocks was measured.

The results are indicated in Table 1 by an index based on the comparative example Ref being 100, wherein the larger the value, the better the block durability.

TABLE 1

| Tire | Ref | Ex1 | Ex2 | Ex3 | Ex4 | Ex5 | Ex6 |
|---|---|---|---|---|---|---|---|
| tread pattern (FIG. No.) | 5 | 1 | 1 | 1 | 1 | 1 | 1 |
| twist angle θ1 (deg.) | 0 | 10 | 5 | 15 | 20 | 25 | 10 |
| area ratio S1/S2 | 0.60 | 0.60 | 0.60 | 0.60 | 0.60 | 0.60 | 0.45 |
| angle θ2 (deg.) | 0 | 0 | 0 | 0 | 0 | 0 | 0 |
| traction | 100 | 106 | 104 | 106 | 105 | 104 | 104 |
| durability | 100 | 103 | 104 | 102 | 101 | 101 | 101 |

| Tire | Ex7 | Ex8 | Ex9 | Ex10 | Ex11 | Ex12 |
|---|---|---|---|---|---|---|
| tread pattern (FIG. No.) | 1 | 1 | 1 | 4 | 4 | 4 |
| twist angle θ1 (deg.) | 10 | 10 | 10 | 15 | 25 | 45 |
| area ratio S1/S2 | 0.55 | 0.65 | 0.70 | 0.60 | 0.60 | 0.60 |
| angle θ2 (deg.) | 0 | 0 | 0 | 15 | 25 | 45 |
| traction | 105 | 106 | 105 | 104 | 104 | 103 |
| durability | 103 | 103 | 102 | 105 | 104 | 103 |

From the test results, it was confirmed that the tires according to the present invention can be improved in the traction performance and the block durability in good balance.

DESCRIPTION OF THE REFERENCE SIGNS 2 tread portion
10 blocks
20 twist block
21 ground contacting top surface of twist block
22 twisted portion

The invention claimed is:

1. A motorcycle tire for running on rough terrain comprising:
a tread portion convexly curved in a tire meridian section so that the tread surface between tread edges is curved radially outwardly and the maximum cross sectional width of the tire occurs between the tread edges, and
the tread portion provided with twist blocks each extending radially outwardly from a bottom surface of the tread portion and having a cross-sectional shape at said bottom surface and a polygonal ground contacting top surface,
wherein
each of the twist blocks is, from its ground contacting top surface to said bottom surface, twisted about an axis which extends in a tire radial direction, intersecting the ground contacting top surface,
in each of the twist blocks, the polygonal ground contacting top surface has an oblique edge on each side in the tire circumferential direction of the twist block which oblique edge is inclined with respect to the tire axial direction,
said cross-sectional shape at the bottom surface of the tread portion has a shape similar to the polygonal ground contacting top surface, except that it has an axial edge on each side in the tire circumferential direction of the twist block which axial edge is substantially parallel with the tire axial direction, and
cross sectional areas of each of the twist blocks when being cut in parallel with the top surface at radial positions between the top surface and said bottom surface are gradually increased towards the radially inside of the tire,
wherein
when the tread portion is sectioned into a crown region centered on the tire equator and having a width of ⅓ of a developed tread width, a pair of shoulder regions extending toward the tire equator from the respectively tread edges and each having a width of ⅙ of the developed tread width, and a pair of middle regions defined between the crown region and the shoulder regions and each having a width of ⅙ of the developed tread width:
the middle regions are each provided with the twist blocks, wherein
the twist blocks in one of the middle regions are twisted in a first direction whereas the twist blocks in the other of the middle regions are twisted in a second direction opposite to the first direction, wherein
- each of the middle regions is further provided with middle non-twisted blocks arranged alternately with the twist blocks in the tire circumferential direction,
- the crown region is provided with crown non-twisted blocks, and
- the shoulder regions are each provided with shoulder non-twisted blocks, wherein
- the middle non-twisted blocks, the crown non-twisted blocks, and the shoulder non-twisted blocks each extend radially outwardly from said bottom surface of the tread portion and each have a substantially rectangular ground contacting top surface, wherein
- the crown non-twisted blocks are disposed on the tire equator, and each have a substantially rectangular ground contacting top surface longer in the tire axial direction than the tire circumferential direction,
- the middle non-twisted blocks each have a substantially square-shaped ground contacting top surface, and
- the shoulder non-twisted blocks each have a substantially square-shaped ground contacting top surface.

2. The motorcycle tire according to claim 1, wherein the ground contacting top surfaces of the crown non-twisted blocks are provided with no groove.

3. The motorcycle tire according to claim 1, wherein
- the crown non-twisted blocks are aligned with the shoulder non-twisted blocks in the shoulder regions in the tire axial direction, and
- in the tire circumferential direction, the twist blocks and the middle non-twisted blocks are located between the crown non-twisted blocks.

4. The motorcycle tire according to claim 2, wherein
- the crown non-twisted blocks are aligned with the shoulder non-twisted blocks in the shoulder regions in the tire axial direction, and
- in the tire circumferential direction, the twist blocks and the middle non-twisted blocks are located between the crown non-twisted blocks.

\* \* \* \* \*